D. R. NUGEN.
AUTOMATIC AIR BRAKE COUPLING.
APPLICATION FILED JULY 16, 1912.
1,084,955.
Patented Jan. 20, 1914.
2 SHEETS—SHEET 1.
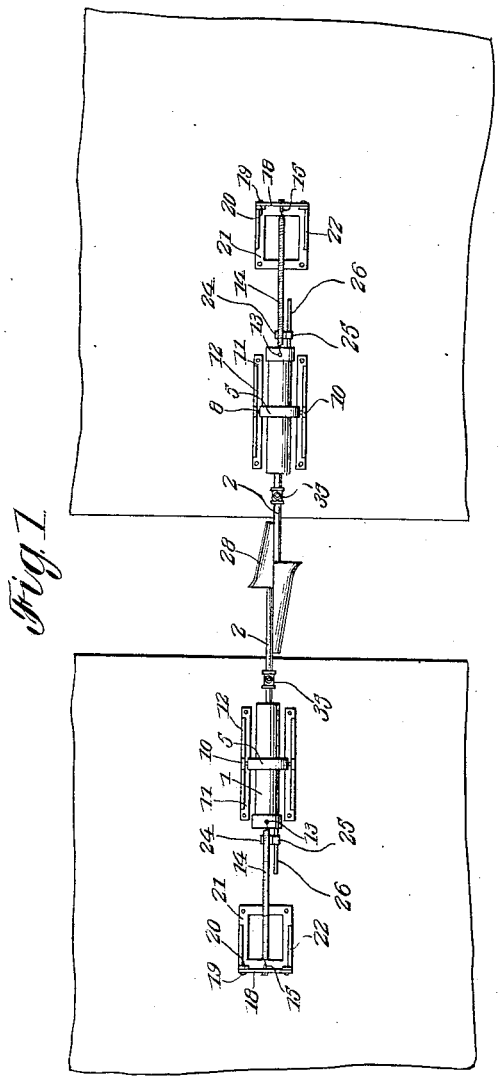
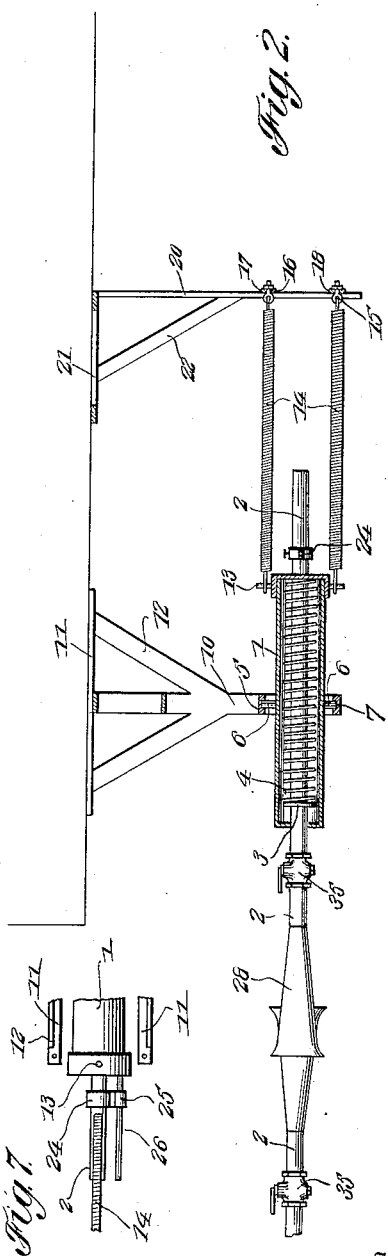
Witnesses
J. H. Crawford.
P. M. Smith.
Inventor
D. R. Nugen,
By Victor J. Evans
Attorney

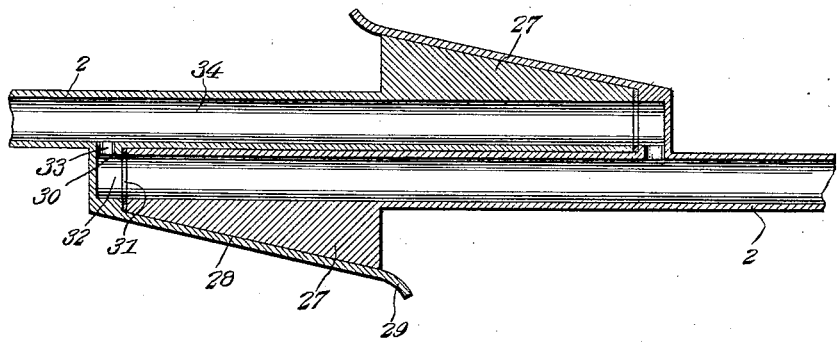
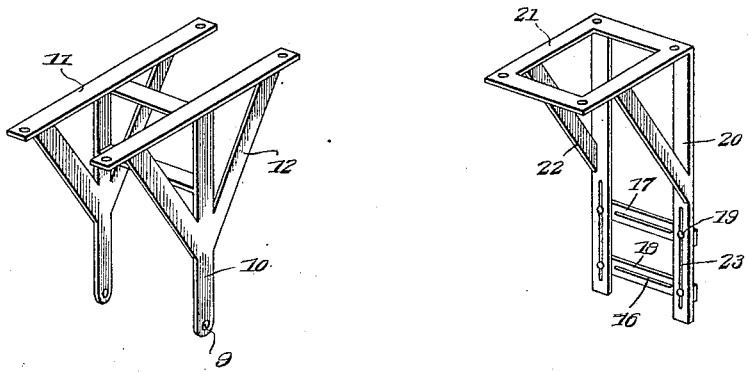
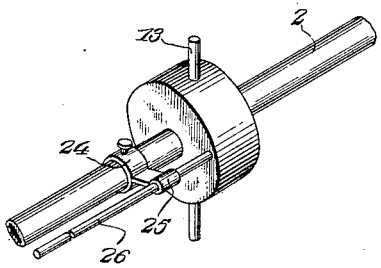

UNITED STATES PATENT OFFICE.

DORCIE R. NUGEN, OF AUBURN, INDIANA.

AUTOMATIC AIR-BRAKE COUPLING.

1,084,955. Specification of Letters Patent. Patented Jan. 20, 1914.

Application filed July 16, 1912. Serial No. 709,707.

*To all whom it may concern:*

Be it known that I, DORCIE R. NUGEN, a citizen of the United States, residing at Auburn, in the county of Dekalb and State of Indiana, have invented new and useful Improvements in Automatic Air-Brake Couplers, of which the following is a specification.

This invention relates to automatic air brake couplers, the object of the invention being to provide simple and reliable means for automatically coupling together and uncoupling the air pipe lines with which the cars are provided, so as to avoid the necessity of a train attendant going between the cars, as at present.

A further object of the invention is to so mount the parts of the coupler that while normally held centered or in alinement with each other with a yielding pressure, the said coupling members may readily swing laterally or up and down, or in any direction to accommodate themselves to the relative movement of the cars, in connection with which they are used, thereby rendering the coupling as a whole always effective, whether the train is ascending or descending a grade, or making a curve.

With the above and other objects in view, the invention consists in the construction, combination and arrangement of parts, as will be hereinafter more fully described, illustrated in the accompanying drawings, and pointed out in the claims hereunto appended.

In the drawings: Figure 1 is a bottom plan view, showing a sufficient portion of two cars to illustrate the application of the present invention thereto. Fig. 2 is a vertical longitudinal section through the connections on one car. Fig. 3 is an enlarged longitudinal section taken through the coupling heads. Fig. 4 is a perspective view of the main hanger. Fig. 5 is a similar view of the spring holding bracket. Fig. 6 is a detail perspective view of one end of the plunger guide, showing the runner and guide rod. Fig. 7 is a detail bottom plan view on an enlarged scale showing the spring casing and the guiding and centering means therefor.

It will be understood that one of the coupling devices of this invention is applied to each end of a car and connected to the usual flexible hose, so as to enable the cars to be coupled together end to end.

Each coupling device as a whole embodies a swiveled plunger guide 1, in which is slidingly mounted a plunger 2 of tubular construction, and forming in effect the end section of the air pipe line. This plunger 2 which is adapted to slide readily through the plunger guide 1 is provided within the guide with a shoulder 3, while between said shoulder and one end of the guide, there is arranged an expansion spring 4, the force of which is utilized to press the plunger outward or toward the end of the car, so as to maintain the head thereof in engagement with the complemental coupler.

The plunger guide 1 is mounted in a swivel ring 5, and in order to enable the plunger guide to oscillate, it is provided with oppositely projecting trunnions 6 which are received in holes 7 at the top and bottom of the ring 5. The ring is further provided, at opposite sides and in the same horizontal plane, with trunnions 8 which enter openings 9 in the pendant arms 10 of a main supporting bracket, embodying in addition to the arms 10, base plates 11 adapted to be secured to the bottom of the car, said plates being connected by means of corner braces 12 with the arms 10.

By the means just described, it will be seen that the plunger guide 1 has a swiveled mounting within the supporting hanger, enabling it to swing upward or downward, laterally, or at an intermediate angle. This permits the plunger to accommodate its position readily at all times to the movements of the car and the other coupler, in connection with which it is used.

In order to center the plunger guide 1, said guide is provided at its inner end with oppositely projecting studs 13, to which are connected the forward extremities of a pair of coiled contractile springs 14, the opposite ends of which are connected to eye bolts 15 mounted in slots 16 extending lengthwise of a pair of cross bars 17 and 18 connected at their ends by means of bolts 19 to the vertical legs 20 of a spring holding bracket, which embodies, in addition to the legs 20, base extensions or attaching portions 21 adapted to be bolted or otherwise secured to the car body, beneath the same, the parts 20 and 21 being further connected by means of corner braces 22. Furthermore, the legs 20 are provided with longitudinal slots 23, in which the bolts 19 are adjustable for the purpose of varying the distance between the cross bars 17 and 18.

It will be seen by means of the construction of the spring holding bracket, that the points of attachment of the rear extremities of the spring may be shifted either vertically or laterally, so as not to interfere with the back and forth movements of the tubular plunger.

In order to prevent the plunger from turning within the plunger guide, a runner 24 is clamped thereon in rear of the guide, as shown, said runner comprising a hook or loop 25 which receives a guide rod 26 projecting from the end of the plunger guide. The guide is in the form of a band which extends around the plunger 2 and is clamped thereon by means of a bolt or screw, as shown. This runner, together with the guide rod, prevents the plunger from turning within the guide, and thereby holds the coupling head and pocket, hereinafter described, in proper position at all times to be coupled with an adjoining plunger head. Furthermore, the runner acts as a stop by coming into contact with the rear end of the plunger guide to prevent the plunger from being pushed too far forward.

The plunger is provided at its outer end and on one side thereof with a hollow conical head 27, and on the opposite side of said plunger is arranged a correspondingly shaped pocket 28 adapted to receive the head 27 of an adjoining coupler, as clearly shown in Fig. 3. It will also be observed that the pocket 28 is flared to some extent at its receiving end, as shown at 29, to facilitate the insertion of the head 27 therein.

At the inner end of the pocket 28, there is formed an annular shoulder 30, against which the end of the conical head is adapted to abut when the coupling members are in operative relation to each other, and by preference, said annular shoulder or seat 30 has a gasket 31 of rubber or some other pliable material applied thereto, so as to form an air-tight connection between the coupling members. Centrally the seat 30 is provided with a port 32 which communicates with the lateral passage 33 leading into the main passage 34 of the tubular plunger.

From the foregoing description, it will now be understood that the tubular plungers are held centered by the centering springs 14 which yield to permit the plunger guides to swivel in their supporting hangers to accommodate the movements of the cars on the track. Therefore, the coupling heads are always maintained in proper position to engage each other, when the cars are pushed together. Furthermore, by reason of the particular arrangement of heads and pockets at the adjacent ends of the tubular plungers, it matters not how the cars are brought together, as all cars equipped with the coupling device of this invention may be readily connected up end to end, irrespective of which end is presented for the coupling operation.

What is claimed is:

1. An automatic air brake coupler, comprising a spring-pressed tubular plunger connected with the air line, a conical head on one side of the plunger, a conical head receiving pocket on the opposite side of the plunger, a centrally swiveled tubular guide for the plunger, and a contractile centering spring connecting one end of said guide with a fixed point and extending in a plane parallel to the major axis of the swiveled guide when in its normal position.

2. An automatic air brake coupler, comprising a spring-pressed tubular plunger connected with the air line, a conical head on one side of the plunger, a conical head receiving pocket on the opposite side of the plunger, a centrally swiveled tubular guide for the plunger, pins projecting from opposite sides of one end of said plunger, and parallel contractile centering springs attached at one end to said pins and at their opposite ends to fixed points, said springs extending in planes parallel to the major axis of the swiveled guide when in its normal position.

3. An automatic air brake coupler, comprising a spring pressed tubular plunger connected with the air line, a conical head on one side of the plunger, a conical head receiving pocket on the opposite side of the plunger, a swiveled tubular guide for the plunger, a guide rod on said guide, and a combined runner and stop on the plunger movable along said guide rod.

In testimony whereof I affix my signature in presence of two witnesses.

DORCIE R. NUGEN.

Witnesses:
AARON M. CARR,
SAM. D. POMEROY.